United States Patent
Byrnes (10) Patent No.: US 6,179,343 B1
(45) Date of Patent: Jan. 30, 2001

(54) INFINITELY SELECTABLE ANGLE PIPE FITTING

(76) Inventor: Dennis S. Byrnes, 113 Yale Ave., Lancaster, PA (US) 17603

( * ) Notice: Under 35 U.S.C. 154(b), the term of this patent shall be extended for 0 days.

(21) Appl. No.: 08/969,423

(22) Filed: Nov. 1, 1997

Related U.S. Application Data (63) Continuation-in-part of application No. 08/677,676, filed on Jul. 8, 1996, now abandoned, which is a continuation-in-part of application No. 08/389,206, filed on Feb. 15, 1995, now abandoned.

(51) Int. Cl.[7] .................................................. F16L 21/08
(52) U.S. Cl. .............................. 285/184; 285/181; 285/2
(58) Field of Search .................................. 285/182, 179, 285/184, 181, 2, 3

(56) References Cited

U.S. PATENT DOCUMENTS

| | | | |
|---|---|---|---|
| 791,397 | * 5/1905 | Asbury | 285/184 |
| 872,331 | 12/1907 | Dreier . | |
| 913,366 | 2/1909 | Donnelly . | |
| 962,621 | 6/1910 | Carlson . | |
| 1,152,974 | 9/1915 | Rice . | |
| 1,566,002 | 12/1925 | Hess . | |
| 1,572,303 | 2/1926 | Millspaugh . | |
| 1,911,311 | 5/1933 | Ernst . | |
| 1,960,557 | 5/1934 | Snyder | 137/75 |
| 2,449,265 | 9/1948 | Williams | 138/49 |
| 2,449,754 | 9/1948 | Seitz | 28/111 |
| 2,654,619 | 10/1953 | Gaum | 285/179 |
| 4,652,017 | * 3/1987 | Drechsel | 285/184 |
| 5,054,513 | 10/1991 | Trueb et al. | 137/375 |

FOREIGN PATENT DOCUMENTS

| | | | |
|---|---|---|---|
| 44109/72 | 1/1974 | (AU) | 285/179 |
| 2608726 | * 6/1985 | (FR) | 285/184 |
| 691942 | 5/1953 | (GB) | 285/212 |
| 1 403 780 | 8/1975 | (GB) | 285/179 |
| 538451 | 1/1956 | (IT) | 285/179 |
| 6-66395 | * 3/1994 | (JP) | 285/184 |

* cited by examiner

*Primary Examiner*—Eric K. Nicholson
(74) *Attorney, Agent, or Firm*—Seidel, Gonda, Lavorgna & Monaco, PC (57) ABSTRACT

A pipe elbow is provided having two parts, each part having an arcuate segment. The arcuate segment of the first part fits sealably into the arcuate segment of the second part. By severing a portion of the arcuate segment of the first part at an angle needed for a specific run of pipe and inserting it into the arcuate segment of the second part, the assembled elbow will conform to the required angle. In addition, a sloped shoulder on the outside of the first part fits in close proximity to the end of the second part to ensure a extension of the first part into the second part in order to meet industry standards for minimum overlap of mating parts. An angled end on the arcuate segment of the second part may also be provided.

27 Claims, 9 Drawing Sheets

INFINITELY SELECTABLE ANGLE PIPE FITTING

CROSS REFERENCE TO RELATED APPLICATION

This is a continuation-in-part of co-pending application Ser. No. 08/677,676, filed Jul. 8, 1996, now abandoned which is a continuation-in-part of application Ser. No. 08/389,206, filed Feb. 15, 1995, now abandoned.

FIELD OF THE INVENTION

The invention is in the field of pipe fittings, specifically pipe elbows and pipe connections.

BACKGROUND OF THE INVENTION

Most piping installations require changes of direction. With rigid pipe, the change in direction is effected with elbow-type fittings which attach to lengths of straight pipe. Conventional pipe elbows are available in fixed angular increments, typically ⅛ bend increments (90, 45, 22½ degrees). When a pipe layout requires an intermediate angular displacement, the pipe fitter finds himself in a difficult situation.

In some specific situations, provision is made for selecting a specific angular displacement. For example, U.S. Pat. No. 2,654,619 to Guam, describes a reducing elbow for welded pipe, part of which has constant radius of curvature and diameter. The pipe fitter can sever the elbow at the desired point and weld it into his run of pipe. Two cuts are required to be made exactly perpendicular to the axis of curvature to provide a weldable fit to the mating piece of pipe. Williams U.S. Pat. No. 2,449,265 provides a rubber automobile radiator hose which can be cut along lines marked to agree with specific automobile models. The hose depends on its elasticity at the cut end for attachment to the car radiator.

A need therefore exists for a pipe elbow which can be adapted to whatever angular displacement is required for a piping installation, and it is this need which the invention addresses.

DEFINITIONS

In what follows, these terms mean these things:

Proximal means the end of a pipe fitting to be connected to a run of pipe.

Distal refers to the end of a pipe fitting farthest from a run of pipe after it has been joined thereto.

Pipe refers to any rigid conduit with a continuous periphery, whether of round, rectangular, or other shape. For example, rectangular duct work is included in ther term "pipe".

Dimensions hereunder means the set of dimensions necessary and sufficient to specify the cross-sectional configuration of a piece of pipe. For round pipe, the term refers to its diameter. When a pipe connection is described, clearance between the mating parts is to be understood as implied. The clearances contemplated are the standard industry clearances appropriate to the material used.

SUMMARY OF THE INVENTION

The pipe fitting of the invention comprises two parts, each with a proximal, or upstream end, and a distal, or downstream end. The proximal end of the first pipe part and the distal end of the second pipe part are contemplated to accommodate standard pipes and fittings. The distal end of the first part has a constant radius of curvature which fits into the proximal end of the second pipe part. The second pipe part has the same radius of curvature as the first pipe part. The first pipe part can be precut to a desired included angle and inserted into the proximal end of the second pipe part. An internal stop is provided within the second pipe part. The distal end of the first pipe part is inserted into the second part until it bottoms against or abuts the stop, providing an elbow of fixed included angle. Alternatively, the first part may be inserted into the second part just far enough to provide the included angle which a given run of pipe requires.

At the proximal end of the first pipe part is a socket with an external sloped shoulder. The proximal end of the second pipe part is formed at an angle transverse to the axis so that the proximal end of the second pipe part abuts the shoulder of the first pipe part around the circumference of the first pipe part. Where the application requires that the first pipe part be cut for a very acute angle, the sloped shoulder provides for a minimum extension of the first pipe part into the second pipe part in order to meet industry standards for minimum insertion of mating parts.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

In the drawings where like numerals identify like elements, there is shown an embodiment of a selectable angle pipe elbow comprising two separate parts. The elbow in FIG. 1 is generally identified by the numeral 10.

Figure 1:
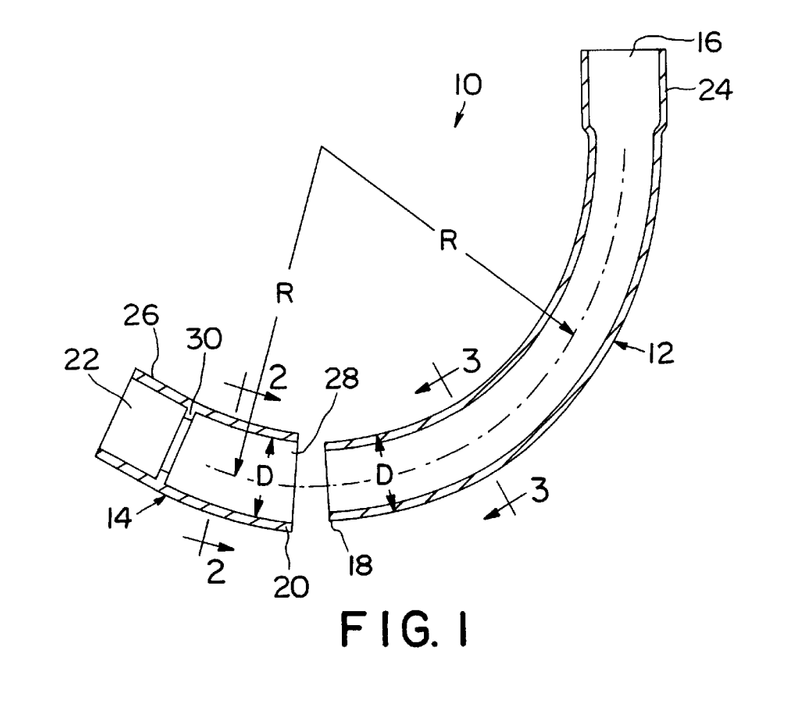
FIG. 1 shows a longitudinal cross-section of an embodiment of a selectable angle pipe elbow of the present invention.
Figure 2:
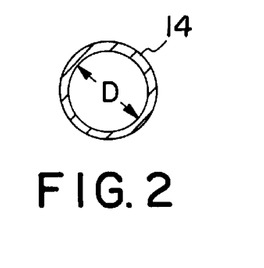
FIG. 2 shows a transverse cross-section of the selectable angle pipe elbow in FIG. 1 as taken along line 2—2.
Figure 3:
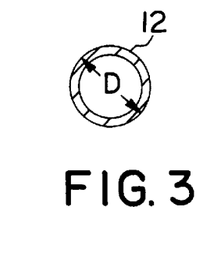
FIG. 3 shows a transverse cross-section of the elbow as taken along line 3—3 in FIG. 1
Figure 4:
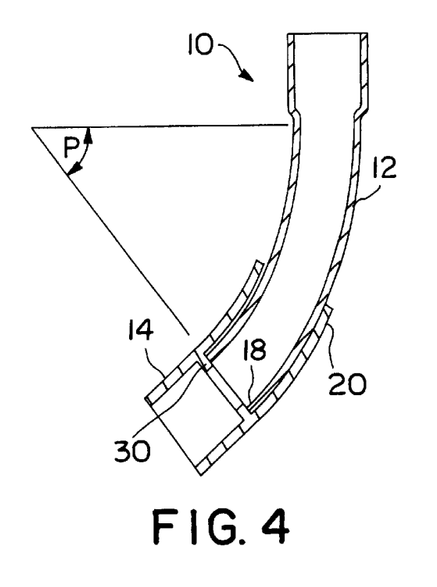
FIG. 4 shows a longitudinal cross section of an assembled elbow in accordance with FIGS. 1–3.

The first part 12 of the elbow 10 and the second part 14 of the elbow 10 are depicted in FIG. 1 in longitudinal cross-section. FIG. 2 is transverse cross-section of the second elbow part 14 having an inside diameter "D". FIG. 3 is a transverse cross-section of the first elbow part 12. The outside diameter of the first elbow part 12 also has a dimension of "D". As shown in FIG. 4, the first part 12 and the second part 14 of the elbow 10 are adapted to mate with one another to form an elbow within a run of pipe (not shown).

The first elbow part 12 includes a proximal end 16 and a distal end 18. The second elbow part 14 includes a proximal end 20 and a distal end 22. The proximal end 16 of the first elbow part 12 comprises a socket 24 which is adapted to fit over a straight standard pipe or over other types of pipe fittings (not shown). From the socket 24 at its proximal end 16 to its distal end 18, the first elbow part 12 is arcuate, with a constant axial radius of curvature "R".

The distal end 22 of the second elbow part 14 also comprises a socket 26 which fits over a straight standard pipe length or over a pipe fitting (not shown) as desired. The proximal end 20 of the second elbow part 14 comprises an arcuate socket 28 which has a constant radius of curvature R, the same as the curvature of the distal end 18 of the first elbow part 12. A boss 30 between the proximal end 20 and the distal end 22 of the second elbow part 14 forms an internal stop. The penetration of the first elbow part 12 into the arcuate opening in the proximal end 20 of the second elbow part 14 is limited by the boss 30, as seen in FIG. 4.

The angle that the assembled elbow 10 (FIG. 4) forms is determined by the arc length of the distal end 18 of the first elbow part 12. The pipe fitter will sever a pre-specified portion of the first elbow part 12 from the distal end 18. When the first part 12 is inserted into the proximal end 20 of the second part 14 and the first part 12 bottoms on the boss 30, a specific angle "P" is formed by the elbow 10. The more material removed from the distal end 18 of the first elbow part 12, the shorter the elbow 10 and the smaller the angle P.

Figures 5, 6, 7, 8:
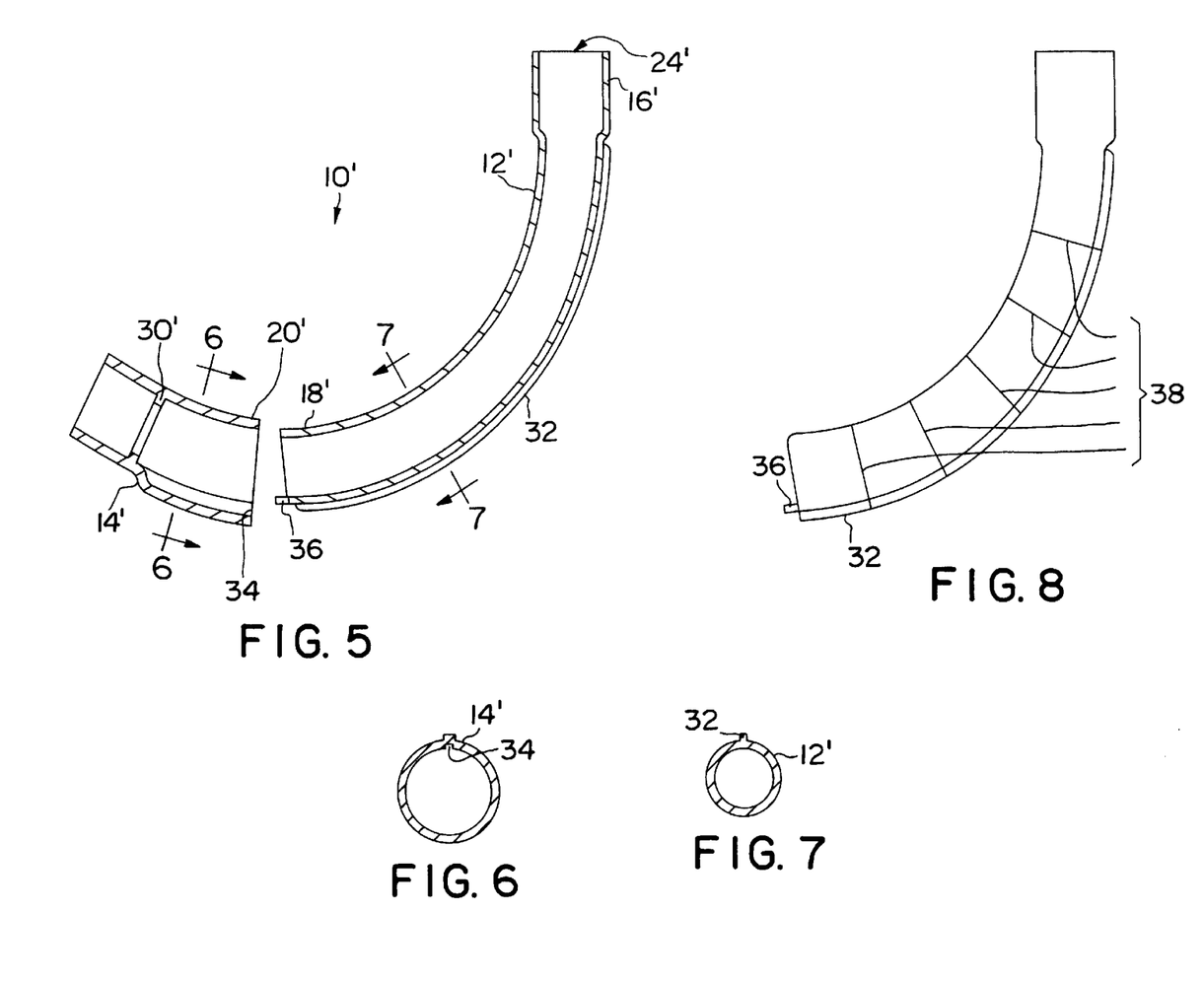
FIG. 5 shows a longitudinal cross-section of another embodiment of a selectable elbow of the present invention.
FIG. 6 shows a transverse cross-section of the elbow of FIG. 5 as taken along line 6—6.
FIG. 7 shows a transverse cross-section of the elbow in FIG. 5 as taken along line 7—7.
FIG. 8 shows a side plan view of a portion of the elbow embodiment in FIG. 5.

FIG. 5 shows another embodiment of the present invention wherein, the first part 12' of the elbow 10' includes an alignment key or spline 32 on its outside surface and the second part 14' includes a corresponding alignment keyway or slot 34 on its inside surface. In FIG. 6, the keyway 34 is shown in the inside surface of the proximal end 20' of the second elbow part 14'. The alignment key 32 is shown in FIG. 7 to project from the outside surface of the first elbow part 12'. As illustrated in FIGS. 5 and 8, the alignment key 32 projects along the arc of the first elbow part 12' from a position adjacent the socket 24' on the proximal end 16' and extends over the arc of the first elbow part 12' to the distal end 18'. The key 32 may be intermittent along the arc of the first part 12'. However, it is contemplated that the keyway 34 will extend along the entire length of the inside surface of the second part 14', starting at the proximal end 20' and ending adjacent the boss 30'. The key 32 and keyway 34 facilitate assembly of the two elbow parts 12' and 14' in the proper planar relationship. A similar type alignment means may also be included with the elbow portions. For example, the cross-sectional configuration of the elbow parts may be non-circular. Thus, the mating of the first and second elbow parts will occur only upon proper alignment of the cross-sections. The cross-sections may include oval, square, rectangular, a non-uniform cross-section, etc.

Figures 9, 10:
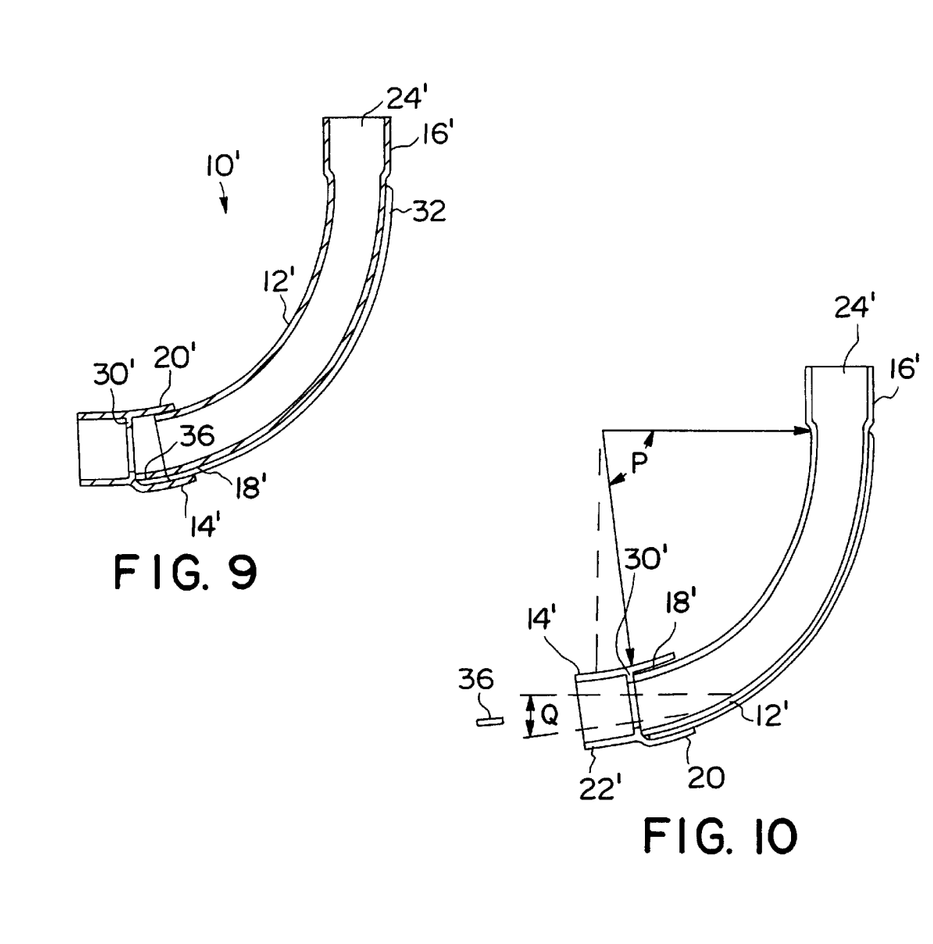
FIG. 9 shows a longitudinal cross-section of an assembled elbow in accordance with FIGS. 5–8 with a frangible tab in place.
FIG. 10 shows a longitudinal cross-section of an assembled elbow in accordance with the embodiment of FIGS. 5–8 with the frangible tab removed.

As shown in FIGS. 5 and 8, also included in this embodiment of the elbow 10' is a frangible tab 36 which projects from the distal end 18' of the first elbow part 12'. The tab 36 projects to a radial position equal to the distal end of the first elbow part 12'. As shown in FIG. 9, the first elbow part 12' with the tab 36 may be inserted into the proximal end 20' of the second elbow part 14'. The tab 36 abuts the boss 30' within the second elbow part 14' and spaces the distal end 18' of the first elbow part 12' from the stop formed by the boss 30' in the second part 14'. The tab means may also be provided on the outside surface of the first elbow part. Here, the tab would abut the tube wall on the second elbow part to prevent complete insertion of distal end 18' of the first part into proximal end 20' of the second part.

In FIG. 8, there is shown on the outside surface of the first elbow part 12' a series of cutting guides 38. The cutting guides 38 are positioned at preselected convenient intervals along the arcuate length of the first elbow part 12'. These cutting guides 38 provide the pipe fitter with a mark to make cuts so as to form the elbow 10' at the desired angle. Of course, the cutting of a portion of the distal end 18' of the first elbow part 12' will remove a portion of curved pipe as well as the tab 36 projecting from the distal end 18'. If the tab is formed on the outside surface of the first part 12', there may be a number of tabs formed at different positions along the length of the elbow portion.

Alternatively, if only a slight angle adjustment is desired, the tab 36 itself can be removed from the distal end 18' of the part 12'. This type of adjustment is shown in FIG. 10. Removal of the tab 36 from the distal end 18' of the first part 12' results in a slight decrease in the angle P. It is contemplated that without the tab 36 being removed, the angle P of the elbow 10' will be 90°. The removal of the tab 36 may be used when flow through a lateral pipe run will depend on gravity (as in drains). Thus, the pipe (not shown) connected downstream from the distal end 22' of the second pipe part 14' will lie at a small angle Q below the horizontal. The angle Q, which is contemplated to be that often specified as a minimum in building codes for a drain pipe, will be equal to the reduction from 90° in angle P.

Without the features of the present invention, when a pipe is to be connected to a conventional 90° elbow one side of which is plumb, the small angle Q to the horizontal must be accomplished by bending the straight run of lateral pipe. This pipe bending puts strain on the assembly and is awkward to install. Of course, other angles are possible by removal of an additional curved pipe section from the distal end 18' of the first pipe portion 12' prior to insertion into and fusion with the second elbow portion 14'.

Figure 11:
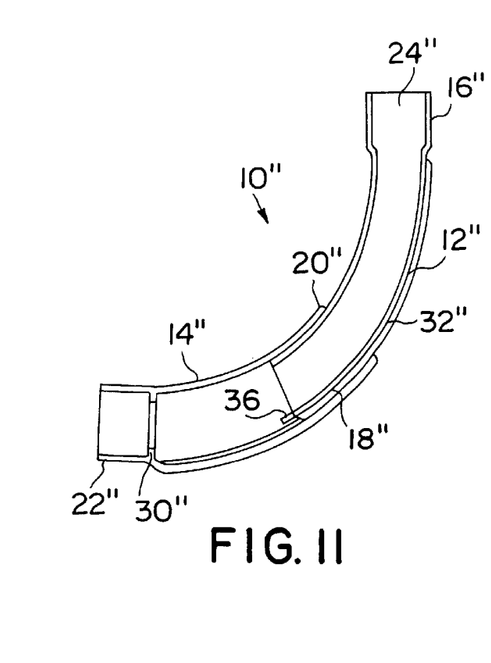
FIG. 11 shows a cross-section of a further embodiment of an assembled selectable pipe elbow as contemplated by the present invention.

Yet another embodiment of the elbow 10" is shown as assembled in FIG. 11. In this embodiment, the proximal, arcuate end 20" of the second elbow part 14" is elongated. Thus, the engagement between the first elbow part 12" and the second elbow part 14" may be easily formed without removal of a portion of the distal end 18" of the first part 12" in forming the angle of the elbow. The pipe fitter would insert the distal, arcuate end 18" of the first part 12" of the elbow 10" only as far as the pipe layout requires. In this embodiment, the proximal end 20" of the second elbow part 14" may also be cut in addition to or as an alternative to cutting the distal end 18" of the first part 12". The position of the cut is also not critical to the angular displacement of the pipe run, since the pipe fitter can adjust the elbow to the requisite included angle as he lays his run of pipe by sliding the two pipe portions 12", 14" along the key 32".

Figure 12:
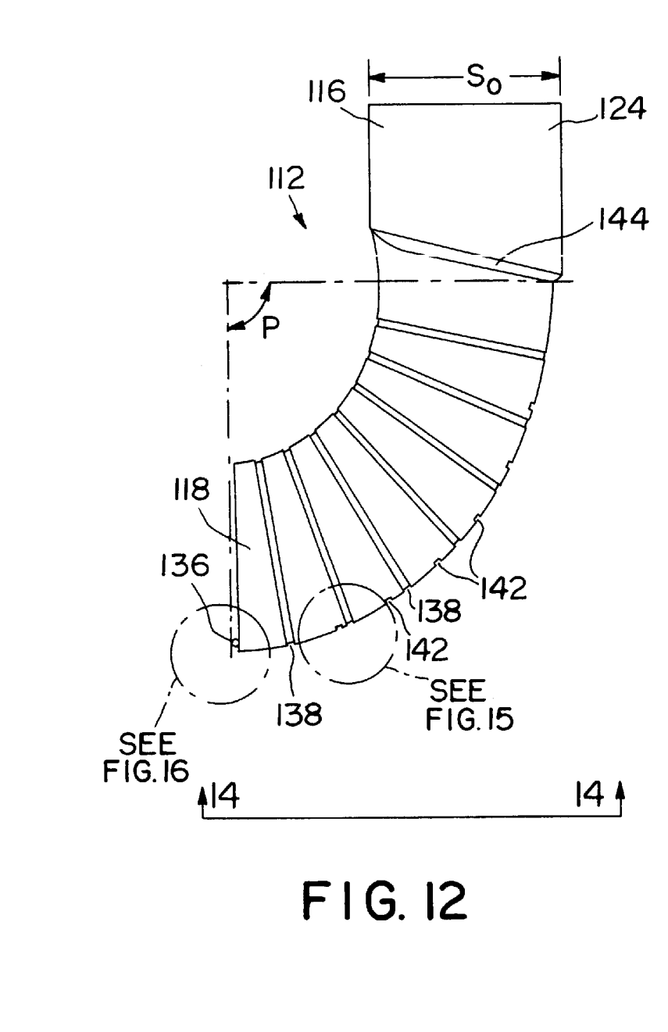
FIG. 12 shows a side plan view of a portion of another embodiment of a selectable elbow of the present invention.
Figure 13:
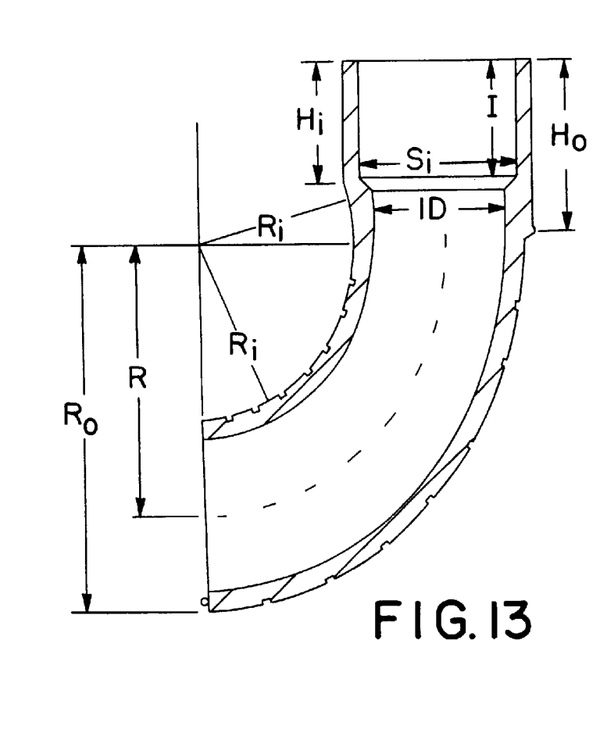
FIG. 13 shows a longitudinal cross-section of the selectable angle pipe elbow in FIG. 12.
Figure 14:
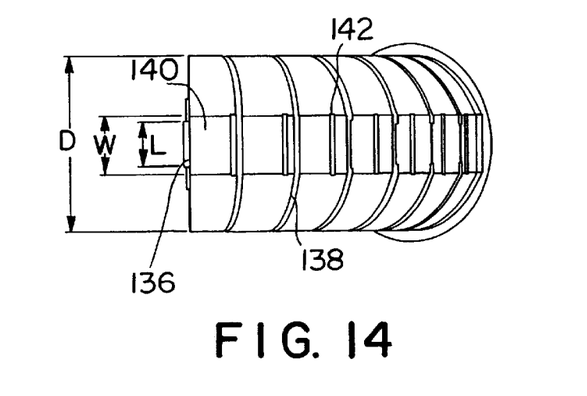
FIG. 14 is a top plan view of the portion of the elbow in FIG. 12 as taken along line 14—14.
Figure 15:
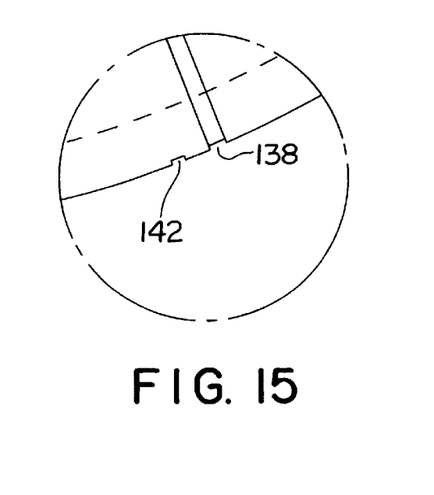
FIG. 15 is an enlarged view of a portion of FIG. 12.
Figure 16:
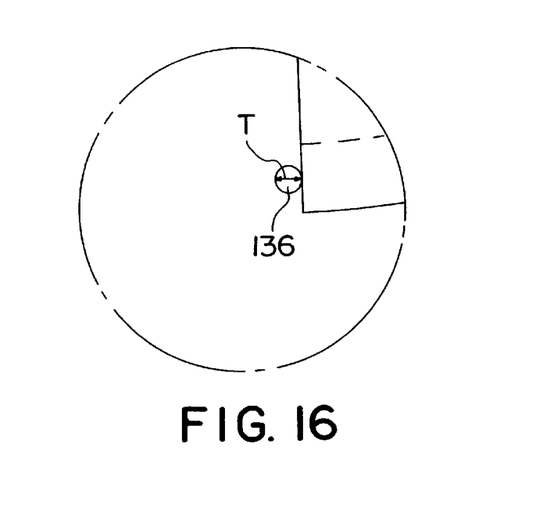
FIG. 16 is an enlarged view of a portion of FIG. 12.
Figure 17:
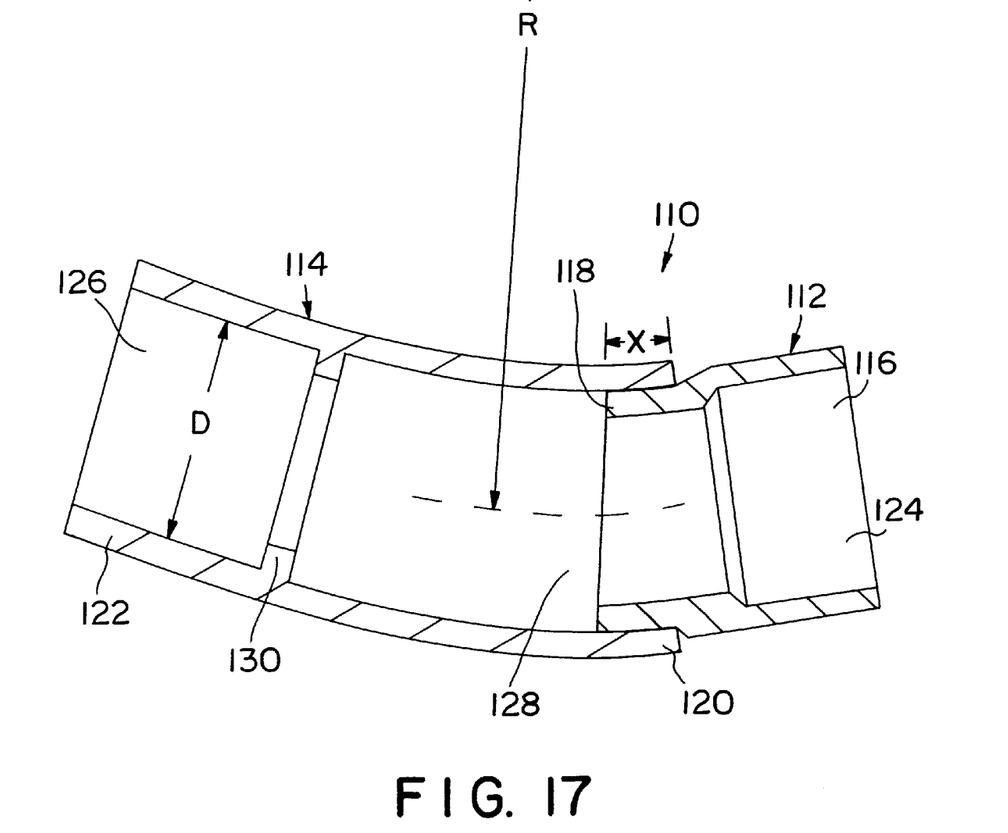
FIG. 17 shows a longitudinal cross-section of an assembled elbow for the embodiment shown in FIG. 12.

FIGS. 12 through 17 show another embodiment of the present invention. As shown in FIGS. 13, 14 and 17, the outer diameter of the first elbow part 112 and the inner diameter of the second elbow part 114 have a dimension D. The first elbow part 112 and the second elbow part 114 are adapted to mate with one another to form an elbow 110 within a run of pipe (not shown). In this embodiment, dimension D is preferably 2.02 inches and the inner diameter of the first elbow part 112 has a dimension ID of 1.61 inches.

The first elbow part 112 includes a proximal end 116 and a distal end 118. The second elbow part 114 includes a proximal end 120 and a distal end 122. The proximal end 116 of the first elbow part 112 comprises a socket 124 which is adapted to fit over a straight standard pipe or over other types of pipe fittings (not shown). The depth I of socket 124 preferably is 1.22 inches. From the proximal end 116 to the distal end 118, the first elbow part 112 is arcuate, with a constant axial radius of curvature R, preferably measuring 2.85 inches, and an inner radius of curvature $R_i$, preferably 1.84 inches. The distal end 122 of the second elbow part 114 also comprises a socket 126 which fits over a straight standard pipe or over a pipe fitting (not shown). The proximal end 120 of the second elbow part 114 comprises an arcuate socket 128 having a constant radius of curvature R which is preferably the same as the curvature of the distal end 118 of the first elbow part 112.

The first part 112 of the elbow includes a flat alignment plane 140 (FIG. 14) on its outside surface which extends from the socket 124 to the distal end 118. The width W of the flat plane 140 preferably measures 0.67 inches. The second elbow part 114 includes a corresponding flat alignment plane on its inside surface (not shown). The flat alignment plane serves as a key to facilitate assembly of the first elbow part 112 and the second elbow part 114 in the proper planar relationship by preventing one part from twisting out of alignment with the other.

Referring to FIGS. 12 and 14, the flat alignment plane 140 of the first elbow part 112 includes a series of reference marks 142 for estimating angle P. Reference marks 142 preferably are formed in 10° increments or intervals along the arcuate length of the flat alignment plane 140 of the first elbow part 112. A series of cutting guides 138 are provided on the outside surface of the first elbow part 112. The cutting guides 138 are preferably located every 11.25° along the arcuate length of the first elbow part 112. The cutting guides 138 provide the pipe fitter with a mark to make cuts so as to form the elbow at the desired angle.

Also included in this embodiment of the elbow 110 is a frangible tab 136 which projects from the distal end 118 of the first elbow part 112. The tab 136 preferably has a length L of 0.51 inches (FIG. 14) and a radius T of 0.04 inches (FIG. 16). The tab 136 abuts the boss 130 in the second elbow part 114 to prevent complete insertion of distal end 118 of the first part 112 into the proximal end 120 of the second elbow part 114. With the tab 136 in place, the angle P (shown in FIG. 12) of the first elbow part 112 will be 90°. If only a slight angle adjustment is desired, the tab 136 can be removed from the distal end 118 of the first part 112, thereby reducing the angle P of the first elbow part 112 preferably in the range of 88°.

The proximal end 116 of the first elbow part 112 comprises a socket 124 which is adapted to fit over a straight standard pipe or over other types of pipe fittings (not shown). Socket 124 has an outer diameter $S_o$ which is greater than dimension D of the first elbow part 112. The outside surface of socket 124 ends a short distance from the proximal end 116 and forms an uneven or angled external shoulder 144, with the shoulder height $H_i$ at the inner radius of curvature $R_i$ being lower than the height $H_o$ of the shoulder at the outer radius of curvature $R_o$. The proximal end 120 of the second elbow part 114 is formed so that if enough material is removed from the distal end 118 of the first elbow part 112 to allow the proximal end 120 to abut the shoulder 144, the proximal end 120 will abut the shoulder around the circumference of the first elbow part 112. The uneven or angled external shoulder 144 and the formation of the proximal end 120 to abut the shoulder 144 around the circumference of the first elbow part 112 provides for overlap between the first elbow part 112 and the second elbow part 114 at the inner radius of curvature $R_i$ even when the distal end 118 of the first elbow part 112 is cut at the cutting guide closest to the shoulder 144. Generally, when a first elbow part having a straight, rather than uneven or angled, shoulder is cut short, there is insufficient overlap of the first and second parts to ensure proper mating of the two parts. This configuration of shoulder 144 and proximal end 120 provides extension X of the first elbow part 112 into the second elbow part 114 even at small angles and meets industry standards for minimum insertion or overlap of mating parts (refer to FIG. 17). In this embodiment, the preferred outer diameter $S_o$ of the socket measures 2.25 inches and the inner diameter $S_i$ of the socket is 1.89 inches. The height $H_i$ preferably measures 1.29 inches and $H_o$ is preferably 1.83 inches.

Figure 18:
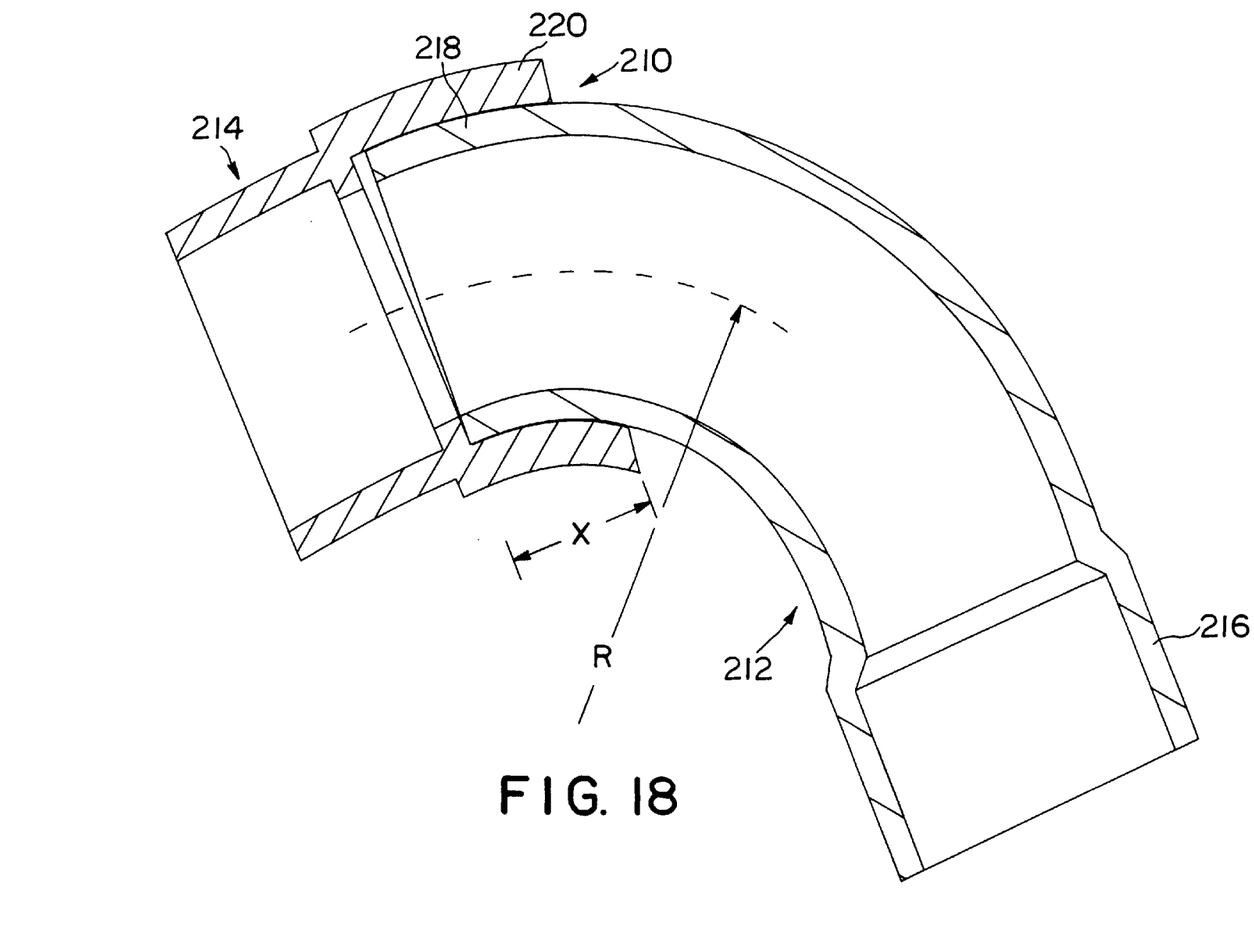
FIG. 18 shows a cross-section of another embodiment of the present invention.

FIGS. 18 through 23 show another elbow embodiment 210 of the present invention. As shown in FIG. 18, the proximal end 220 of a second elbow part 214 is adapted to mate with the distal end 218 of a first elbow part 212 to form the elbow 210 within a run of pipe (not shown).

Figure 19:
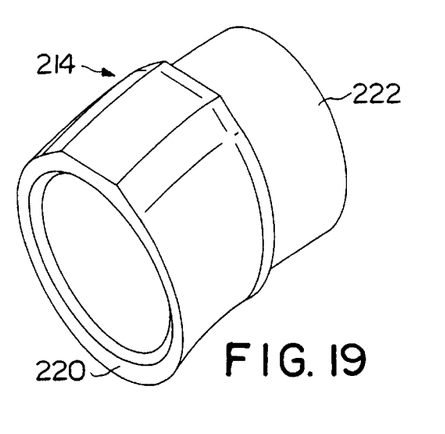
FIG. 19 is a perspective view of a portion of the elbow embodiment shown in FIG. 18.
Figure 20:
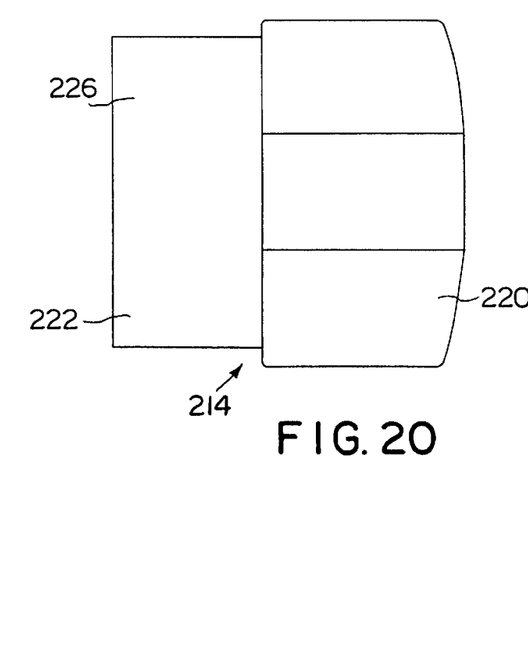
FIG. 20 is a top plan view of a portion of the elbow embodiment in FIG. 18.
Figure 21:
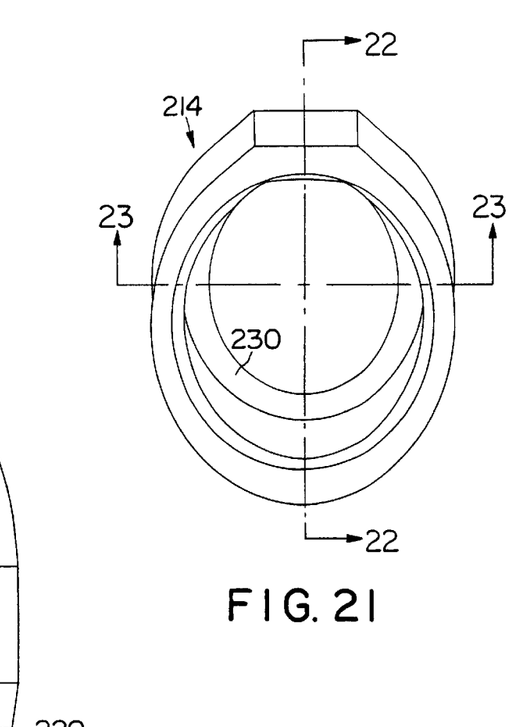
FIG. 21 is a perspective view of the portion of the elbow in FIG. 18.
Figure 22:
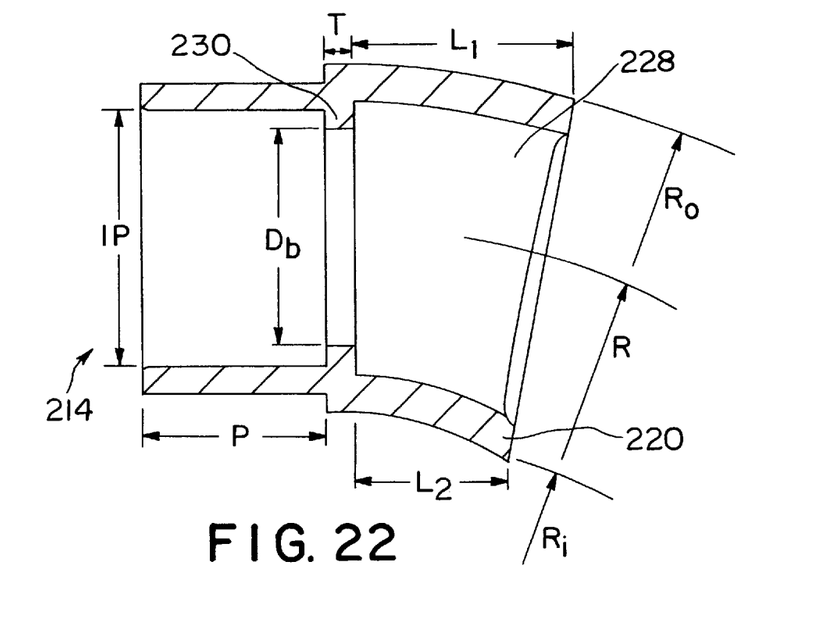
FIG. 22 is a cross-section of a portion of the elbow embodiment as taken along line 22—22 in FIG. 21.

FIGS. 19 and 20 show the second elbow part 214 which includes a proximal end 220 and a distal end 222. The distal end 222 of the second elbow part 214 also comprises a pipe section 226 which fits inside a straight standard pipe length (not shown). The distal end may also be sized to connect with a straight pipe fitting or socket (not shown) for connection to a length of pipe (also not shown) which may be of the same outer diameter as section 226 on the distal end 222. FIG. 22 shows that section 226 has an inner diameter IP which is preferably 1.89 inches and a section length P which is preferably 1.22 inches.

Figure 23:
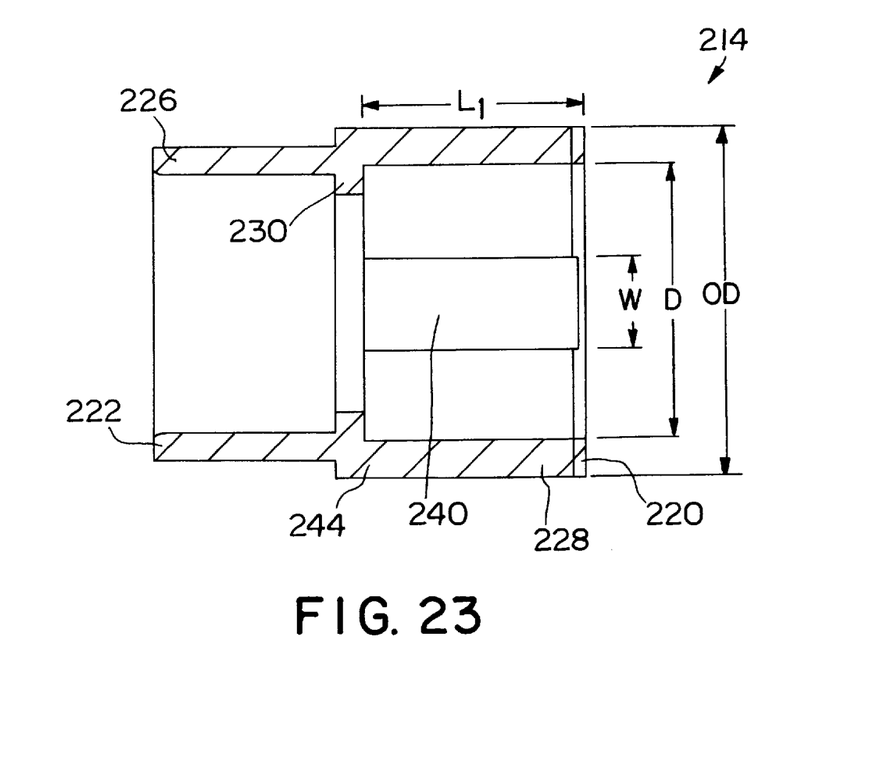
FIG. 23 is a cross-section of a portion of the elbow embodiment as taken along line 23—23 in FIG. 21.

The proximal end 220 of the second elbow part 214 comprises an arcuate socket 228. The socket 228 has a constant radius of curvature R, the same as the curvature of the distal end 218 of the first elbow part 212. FIGS. 18, 22 and 23 show that the socket 228 has an outer diameter OD which is greater than the inner diameter D of the second elbow part 214. The outside surface of the socket 228 ends a short distance from the proximal end 220 and forms an external shoulder 244 that is perpendicular to the distal end 222 of the second elbow part 214. The height $L_2$ of the shoulder 244 at the inner radius of curvature $R_i$ of the second elbow part 214 is lower than the height $L_1$ of the shoulder at the outer radius of curvature $R_o$ of the second elbow part 214. The outer diameter OD of the socket 228 preferably measures 2.57 inches and the inner diameter D is 2.02 inches. $L_1$ measures preferably 1.47 inches and $L_2$ is preferably 1.02 inches.

As shown in FIGS. 22 and 23, an internal boss 230 is situated between socket 228 and pipe section 226. The boss 230 preferably has a thickness T of 0.19 inches and a height or boss diameter $D_b$ of 1.61 inches. When the distal end 218 of the first elbow part 212 is inserted into the socket 228 and stops against the boss 230, the shoulder 244 ensures a minimum extension or overlap X between the first elbow part 212 and the second elbow part 214 at the inner radius of curvature $R_i$ even when the distal end 218 of the first elbow part 212 is cut at the cutting guide closest to the proximal end 216 of the first elbow part 212. Otherwise, when the first elbow part is cut short, there may be insufficient overlap of the first and second parts to ensure proper mating of the two parts. In contrast, the overlap provided will meet industry standards for minimum insertion of mating parts (refer to FIG. 18).

Referring to FIG. 23, the second elbow part 214 includes a flat alignment plane 240 on the inside surface of the socket 228. The plane 240 extends the full length of the socket 228 from the boss 230 to the proximal end 220 of the second elbow part 214. The width W of the flat plane 240 preferably measures 0.67 inches. The first elbow part 212 (FIG. 18) includes a corresponding flat alignment plane on its outside surface (not shown). The flat alignment plane facilitates assembly of the first elbow part 212 and the second elbow part 214 in the proper planar relationship by preventing one part from twisting out of alignment with the other part. The flat plane on either part of the elbow can also be used to rest the part or a table top or the like during assembly. When resting on the flat surface the part will stay in position without falling over.

The present invention may be embodied in other specific forms without departing from the spirit or essential attributes thereof and, accordingly, reference should be made to the appended claims, rather than to the foregoing specification, as indicating the scope of the invention.

What is claimed is:

1. A selectable angle pipe elbow comprising:
    two parts, each part having an inside and an outside surface and a proximal and a distal end,
    the first part comprising an arcuate segment having an outside cross-sectional dimension D and a constant axial radius of curvature R on its distal end, and means on the proximal end of the first part adapted to connect to a pipe or pipe fitting,
    the second part comprising an arcuate segment having a wall which has an inside cross-sectional dimension D and a constant axial radius of curvature R on its proximal end, means on the distal end of the second part adapted to connect to a pipe or pipe fitting, and an internal boss between the distal and the proximal ends of the second part, the boss having a first end proximal to the arcuate segment of the second part and a second end distal from the arcuate segment of the second part, the boss projecting inward from the inside surface from the wall, the outside cross-sectional dimension of the second part between the first and second ends of the boss being equal to the outside cross-sectional dimension of the arcuate segment of the second part.

2. The selectable angle pipe elbow of claim 1 further comprising:
    an alignment key on the outside surface of the arcuate segment of the first part, and
    a keyway in the inside surface of the arcuate segment of the second part adapted to receive the alignment key.

3. The selectable angle pipe elbow of claim 1 further comprising means for aligning the arcuate segment of the second part with the arcuate segment of the first part.

4. The selectable angle pipe elbow of claim 3, wherein the aligning means comprises:
    an alignment key on the outside surface of the arcuate segment of the first part, and
    a keyway in the inside surface of the arcuate segment of the second part adapted to receive the alignment key.

5. The selectable pipe elbow of claim 3, wherein the aligning means comprises a non-circular cross-sectional configuration for at least the distal end of the first part and the proximal end of the second part.

6. The selectable angle pipe elbow of claim 3, wherein the aligning means comprises:
    a first flat alignment plane on the outside surface of the arcuate segment of the first part, and
    a second flat alignment plane on the inside surface of the arcuate segment of the second part, the second alignment plane corresponding in size and location to the first alignment plane.

7. The selectable angle pipe elbow of claim 1 further comprising frangible means on the first part for preventing the distal end of the first part from touching the boss of the second part.

8. The selectable angle pipe elbow of claim 7, wherein the means for preventing the distal end of the first part from touching the boss of the second part comprises a frangible extension on the distal end of the first part.

9. The selectable angle pipe elbow of claim 7, wherein the means for preventing the distal end of the first part from touching the boss of the second part comprises a frangible extension on the outside surface of the first part.

10. The selectable angle pipe elbow of claim 1, wherein the first part has an inner radius of curvature and an outer radius of curvature and a proximal end formed perpendicular to the axis of the first part,
    the first part having a socket at its proximal end, the socket having an inside and outside surface, the outside surface of the socket having an outside cross-sectional dimension greater than the outside cross-sectional dimension D of the first part and forming an external shoulder where the outside surface of the socket ends, the shoulder being formed so that the distance from the proximal end of the first part to the shoulder on the inner radius of curvature is less than the distance from the proximal end of the first part to the shoulder on the outer radius of curvature, and
    the second part having a proximal end formed so as to conform to and abut the shoulder of the first part along the perimeter of the first part.

11. The selectable angle pipe elbow of claim 1, wherein the outside surface of the first part further comprises a plurality of cutting guides located at preselected intervals along the arcuate segment of the first part.

12. The selectable angle pipe elbow of claim 1, wherein the outside surface of the first part further comprises a plurality of reference marks located at preselected intervals along the arcuate segment of the first part.

13. The selectable angle pipe elbow of claim 1, wherein the second part further comprises:
an inner radius of curvature and an outer radius of curvature, and
a socket at the proximal end of the second part, the socket having an inside surface and an outside surface, the outside surface of the socket having an outside cross-sectional dimension greater than the inside cross-sectional dimension of the second part and forming an external shoulder where the outside surface of the socket ends, the shoulder being parallel to the distal end of the second part and being formed so that the distance from the proximal end of the second part to the shoulder on the inner radius of curvature is less than the distance from the proximal end of the second part to the shoulder on the outer radius of curvature,
the distal end of the second part adapted to insert into a pipe or pipe fitting.

14. A selectable angle pipe elbow comprising:
two parts, each part having an inside and an outside surface and a proximal and a distal end,
the first part comprising an arcuate segment having an outside cross-sectional dimension D and a constant axial radius of curvature R on its distal end, an inner radius of curvature and an outer radius of curvature, and means on the proximal end of the first part adapted to connect to a pipe or pipe fitting, the proximal end of the first part formed perpendicular to the axis of the first part,
the second part comprising an arcuate segment having an inside cross-sectional dimension D and a constant axial radius of curvature R on its proximal end, means on the distal end of the second part adapted to connect to a pipe or pipe fitting, and an internal boss between the distal and the proximal ends of the second part, and
means on the first part for preventing its distal end of the first part from touching the boss between the distal end and the proximal end,
the first part having a socket at the proximal end, the socket having an inside and outside surface, the outside surface of the socket having an outside cross-sectional dimension greater than the outside cross-sectional dimension D of the first part and forming an external shoulder where the outside surface of the socket ends, the shoulder being formed so that the distance from the proximal end of the first part to the shoulder on the inner radius of curvature is less than the distance from the proximal end of the first part to the shoulder on the outer radius of curvature,
the proximal end of the second part [having a proximal end] formed so as to conform to and abut the shoulder of the first part along the perimeter of the first part.

15. A selectable angle pipe elbow as claimed in claim 14, wherein the means for preventing the distal end of the first part from touching the boss of the second part comprises a frangible extension on the distal end of the first part.

16. A selectable angle pipe elbow as claimed in claim 14 further comprising means for aligning the arcuate segment of the second part and with the arcuate segment of the first part.

17. A selectable angle pipe elbow as claimed in claim 16, wherein the means for aligning the second part with the first part comprises a first flat alignment plane on the outside surface of the first part and a second flat alignment plane on the inside surface of the second part, the second alignment plane corresponding in size and location to the first alignment plane.

18. A selectable angle pipe elbow as claimed in claim 14 further comprising a plurality of reference marks along the arcuate length of the flat plane on the outside surface of the first part.

19. A selectable angle pipe elbow as claimed in claim 14 further comprising a plurality of cutting guides circumscribing the outside surface of the first part along the arcuate segment of the first part.

20. A selectable angle pipe elbow comprising:
two parts, each part having an inside and an outside surface and a proximal and a distal end,
the first part comprising an arcuate segment having an outside cross-sectional dimension D and a constant axial radius of curvature R on its distal end, an inner radius of curvature and an outer radius of curvature, the proximal end of the first part formed perpendicular to the axis of the first part,
the second part comprising an arcuate segment having an inside cross-sectional dimension D and a constant axial radius of curvature R on its proximal end and adapted to connect with the distal end of the first elbow part, means on the distal end of the second part adapted to connect to a pipe or pipe fitting, and an internal boss between the distal and the proximal ends of the second part,
a frangible extension on the distal end of the first part to prevent the distal end of the first part from touching the boss of the second part,
the outside surface of the first part having a first flat alignment plane, and the inside surface of the second part having a second flat alignment plane corresponding in size and location to the first alignment plane, for aligning the first and second parts,
the first part having a socket on its proximal end for connecting to a pipe or pipe fitting, the socket having an inside and outside surface, the outside surface of the socket having an outside cross-sectional dimension greater than the outside cross-sectional dimension D of the first part,
a plurality of reference marks along the arcuate length of the first flat plane on the outside surface of the first part, and
a plurality of cutting guides circumscribing the outside surface of the first part along the arcuate segment of the first part.

21. A selectable angle pipe elbow as claimed in claim 20 wherein the socket further comprises an external shoulder and wherein the distance from the proximal end of the first part to the shoulder on the inner radius of curvature is less than the distance from the proximal end of the first part to the shoulder on the outer radius of curvature.

22. A selectable angle pipe elbow as claimed in claim 21 wherein the proximal end of the second part is formed so as to conform to and abut the shoulder of the first part along the perimeter of the first part.

23. A selectable angle pipe elbow as claimed in claim 20 wherein the proximal end of the second elbow part extends from the internal boss on the outer radius of curvature of the second part for a distance greater than the extension from the boss on the inner radius of curvature of the second part.

24. A selectable angle elbow as claimed in claim 20 wherein the socket further comprises an external shoulder and wherein the distance from the proximal end of the first part to the shoulder on the inner radius of curvature of the first part is less than the distance from the proximal end to the shoulder on the outer radius of curvature of the first part.

25. A selectable angle pipe elbow as claimed in claim 24 wherein the proximal end of the second elbow part conforms to the form of the shoulder on the first part along its perimeter.

26. A selectable angle pipe elbow as claimed in claim 20 wherein the proximal end of the first elbow part is formed with a uniform surface between the extension from the boss on the inner radius of curvature of the first part and the extension from the boss on the outer radius of curvature of the first part.

27. A two part selectable angle pipe elbow comprising:

a first part having an arcuate segment having a constant axial radius of curvature on a distal end thereof, the first part defining an inner radius of curvature and an outer radius of curvature, the first part further having a proximal end for communicating with a pipe or pipefitting, a second part having a proximal end and a distal end, the proximal end having an inner diameter adapted to receive and mate with the distal end of the first part, the distal end of the second part adapted for communicating with a pipe or pipe fitting, the proximal end of the second part formed with an inner radius of curvature and an outer radius of curvature substantially the same as the inner and outer radii of the distal end of the first part, and a stop within the second elbow part, the stop defining a maximum insertion for the first part within the second part, the surface of the proximal end of the second part being substantially planar, the plane of the surface being non-parallel to any radius line for the inner or outer curvatures.

* * * * *

UNITED STATES PATENT AND TRADEMARK OFFICE
CERTIFICATE OF CORRECTION

PATENT NO.   : 6,179,343 B1
DATED        : January 30, 2001
INVENTOR(S)  : Dennis S. Byrnes It is certified that error appears in the above-identified patent and that said Letters Patent is hereby corrected as shown below:

Column 9,
Lines 53 and 54, delete "[having a proximal end]".

Signed and Sealed this

Twenty-fifth Day of December, 2001

Attest:

Attesting Officer

JAMES E. ROGAN
*Director of the United States Patent and Trademark Office*